2,744,151

CONVERSION OF METHANOL TO HYDROCARBONS AT SUPERATMOSPHERIC PRESSURE OVER MODIFIED METAL MOLYBDITE CATALYSTS

Frank S. Fawcett, Wilmington, Del., and Benjamin W. Howk, West Chester, Pa., assignors to E. I. du Pont de Nemours & Company, Wilmington, Del., a corporation of Delaware No Drawing. Application January 30, 1953, Serial No. 334,376

6 Claims. (Cl. 260—682)

This invention relates to a catalystic process for preparing hydrocarbons.

It is known to effect thermal control in the conversion of oxides of carbon to hydrocarbons containing more than one carbon atom per molecule, by hydrogenation over Group VIII metals, or compounds of such metals, by effecting the reaction in the presence of an alkanol, especially methanol and ethanol.

It has now been found that valuable essentially hydrocarbon products can be obtained by contacting methanol alone with a catalyst comprising a hydrogenating metal molybdite modified with a nickel chromite at an elevated temperature and pressure.

In accord with the process of this invention a hydrocarbon wax is prepared by introducing methanol into a pressure-resistant reaction vessel, heating the said methanol under superatmoshperic pressure without addition of any other reactant at a reaction temperature within the range of 100° to 350° C. in the presence of a metal molybdite modified as described herein, continuing said heating until the said metanol is converted, at least in part, to an essentially hydrocarbon wax, and thereafter separating the said wax from the resulting mixture.

This invention accordingly provides a simple method for obtaining valuable hydrocarbon products from methanol.

In one practical embodiment, a pressure reactor is charged with methanol and catalyst. The reactor is cooled, evacuated, and thereafter closed. The charge is then heated to between 100° and 350° C. for from 2 to 24 hours under super-atmospheric pressures, which may be autogenously developed. The reactor is permitted to cool, after which it is opened, and the contents discharged and filtered. The solid, consisting of catalyst and solid hydrocarbons, is extracted with a suitable solvent such as benzene or xylene to recover the solid hydrocarbon. The filtrate is then processed, by methods well known to those skilled in the art, to separate liquid and solid hydrocarbon products from unreated methanol.

The examples which follow are submitted to illustrate and not to limit this invention.

Example I

A mixture of 300 cc. of methanol, 20 g. of nickel chromite, and 20 g. of nickel molybdite, prepared as disclosed subsequently, was charged to a pressure vessel and heated at 250° C. An initial pressure of 800 atmospheres was then established by injecting liquid methanol. After 15 hours, during which time the apparatus was periodically vented to maintain the pressure below 1000 atmospheres, the reaction vessel was cooled and opened. There was obtained a crude product containing lumps of waxy material together with suspended catalyst. The product was filtered, extracted with boiling xylene, and the extract drowned in methanol. There was thus obtained 0.52 g. of a white hydrocarbon polymer, M. P. 117°–121° C., inherent viscosity, 0.1% in tetralin at 125° C.) 0.33.

Anal.—Calc'd for $(CH_2)n$: C, 85.6; H, 14.4. Found: C, 85.24; H, 14.27.

Example II

A mixture of 300 cc. of methanol, 20 g. of nickel molybdite and 20 g. of nickel chromite was heated at 250° C. for 15 hours in a pressure vessel, during which time a pressure of 850–950 atmospheres was observed. Gaseous products were allowed to escape to maintain the pressure below 1000 atmospheres. Extraction of the solid material with xylene and precipitation with methanol yielded 0.60 g. of hydrocarbon polymer, M. P. 117°–126° C., inherent viscosity (0.1% in tetralin at 125° C.) 0.35.

Example III

Example II was repeated, except that the methanol contained 10 g. of potassium hydroxide. There was obtained 0.45 g. of white solid polymer.

Example IV

A mixture of 300 cc. of methanol and 20 g. of a mixed nickel chromite-molybdite catalylst, prepared as described hereinafter, was placed in a pressure reactor and heated at 250° C. under an autogenous pressure of 940 atmospheres for 15 hours. Extraction of the crude solid product with boiling xylene followed by precipitation with methanol gave 0.4 g. of hydrocarbon polymer, inherent viscosity (0.1% in tetralin at 125° C) 0.27.

The nickel chromite-molybdite catalyst used in the above experiment was prepared by mixing freshly precipitated slurries of nickel ammonium chromate and nickel amino molybdate in approximately equal weights, followed by filtration, drying, and reduction at 400° C. for 24 hours with hydrogen flowing at a space velocity of 100 hr.$^{-1}$.

Example V

The procedure of Example II was repeated using 2 g. of nickel chromite and 20 g. of nickel molybite instead of the proportions used above and there was obtained 0.13 g. of hydrocarbon polymer.

Similar results were obtained using 20 g. of nickel chromite and 2 g. of nickel molybdite at 250° C.

The examples have illustrated preferred embodiments and are not to be construed as limiting the invention.

The process of this invention can be carried out as a batch, semi-continuous, or continuous operation.

In a continuous flow process, the alcohol under pressure is passed over a stationary bed of catalyst at such a rate as to permit sufficient time of contact with the heated catalyst to bring about the desired reaction.

The process can be carried out at temperatures of from 100° to 350° C., but since best results from the standpoint of hydrocarbon production of desired molecular weight distribution are obtained in the range of 150° to 275° C., this embraces the temperature conditions generally used.

The time of reaction varies over wide limits and depends upon the temperature and pressure conditions used, activity of the catalyst, and mode of operation. In a batch process, employing autogenous pressures, a suitable time is between 2 and 24 hours.

As illustrated by the working examples, in batch operation, the pressure may be that developed under the temperature conditions used. Pressures which can be readily developed in this manner are within the range of 70 to 1000 atmospheres. Suitably, these pressures can be as low as 70 atmospheres, at the lower temperatures which are usefully employable, up to 900 or more atmospheres at the higher temperatures. In a continuous flow process, the pressure can be controlled within the indicated range by known methods. It is permissible to provide pressures within the said operable range by applying pressure externally or by partially relieving autogeneously developed pressures, in batch or continuous processes.

The metal molybdite catalysts used in the practice of this invention are those disclosed in U. S. 2,572,300. Examples of such metal molybdites are copper molybdite, $CuMoO_3$, nickel molybdite, $NiMoO_2$, and cobalt molybdite, $CoMoO_2$ and $CoMoO_3$. These molybdites, modified with a nickel chromite can be used in the practice of this invention.

The preparation of nickel molybdite is illustrated below.

Seventeen-hundred sixty-six grams of ammonium p-molybdate $((NH_4)_6Mo_7O_{24}.4H_2O)$, equivalent to 10 moles of $MoO_3$, was dissolved in 5000 cc. of distilled water and neutralized by the addition of 900 cc. of 28% aqueous ammonia. The resulting solution of ammonium molybdate $((NH_4)_2MoO_4)$, containing 1,9 moles of excess ammonia, was then added, with stirring, at room temperature to a solution of nickel nitrate, prepared by dissolving 2908 grams of nickel nitrate hexahydrate $Ni(No_3)_2.6H_2O$, equivalent to 10 moles of nickel, in 5000 cc. of distilled water. A pale green precipitate was formed in an acid slurry having a pH of approximately 4 by alkaline-acid paper. The pH of the slurry was adjusted to 7 (Beckman pH meter) by the addition of 500 cc. of 28% aqueous ammonia. The precipitate was then cooled, filtered, dried, and calcined at 400° C. for 18 hours. The calcined product, by analysis, was found to contain 23.2% nickel and 46.4% molybdenum. The calcined product was reduced in hydrogen at gradually increasing temperatures up to 550° C. The reduced product was highly pyrophoric and glowed on exposure to air. Analysis showed the reduced product to contain 26.66% nickel and 53.1% molybdenum, corresponding to $NiMoO_2.O.2MoO_3$.

Nickel chromite is prepared as follows:

Nickel ammonium chromate is precipitated by the addition of an approximately 2 molar aqueous solution of ammonium chromate to an equivalent amount of an approximately 2 molar aqueous solution of nickel nitrate at 70°–80° C. The precipitate is filtered, washed, and calcined at 300°–400° C. The calcined material is treated with hydrogen at 400° C. with a space velocity of about 500 hr.$^{-1}$.

The weight ratio of nickel molybdite: nickel chromite in such catalysts may be varied from 20:1 to 1:20. The best compositions from the standpoint of conversion to desired hydrocarbons, and reaction rate, are those in which the weight ratio of nickel molybdite:nickel chromite varies from 2:1 to 1:1. In preparing the modified nickel molybdite catalysts used in the practice of this invention, the separately prepared nickel molybdite and nickel chromite may be mixed in the desired proportions just before use. Alternatively, the mixed catalysts may be made by co-precipitation, or, if desired, slurries of the separately made nickel molybdate and nickel chromate may be mixed, after which the mixture can be dried, and then reduced in hydrogen, as illustrated in Example 4.

If desired, the mixed catalysts may be unsupported or they may be deposited on extenders such as kieselguhr, magnesia, carbon, fuller's earth, silica, and the like.

The catalysts may be used as pellets or as finely divided powders. For use in a continuous flow process it is best that the catalyst be in the form of pellets and thus minimize mechanical losses and avoid excessive resistance to fluid flow. In batch operation, it is best that the catalyst be in finely divided form because in that way maximum activity is obtained.

In batch operation the amount of catalyst is at least 3% by weight of the methanol being processed. No practical advantage accrues from the use of more than about 15% of catalyst, by weight of the methanol, and this therefore constitutes a practical upper limit of catalyst concentration. The best results are realized in the range of 5% to 10%, by weight of the methanol, and this embraces the catalyst concentration most generally used.

In a continuous flow process the alcohol under pressure is passed over a stationary bed of catalyst at such rate as to permit sufficient time of contact with the catalyst to bring about the desired reaction at a practical rate. Alternatively, a slurry of finely divided catalyst in methanol can be pumped under pressure through a heated reaction zone at an appropriate rate of flow.

The process of this invention provides a practical route to valuable hydrocarbons directly from methanol. The hydrocarbons vary from liquid products useful as fuels and lubricants to high molecular weight, normally solid, tough products which find utility as plastics, waxes for coatings, polishes, and the like.

We claim:

1. A process for preparing a normally solid hydrocarbon wax which comprises introducing methanol into a pressure-resistant reaction vessel, heating the said methanol under superatmospheric pressure without addition of any other reactant at a reaction temperature within the range of 100° to 350° C. in the presence of a catalyst containing a metal molybdite modified with a nickel chromite, continuing said heating until the said methanol is converted, at least in part, to a normally solid essentially hydrocarbon wax, and thereafter separating the said wax from the resulting mixture.

2. A process for preparing a normally solid hydrocarbon wax which comprises introducing methanol into a pressure-resistant reaction vessel, heating the said methanol under superatmospheric pressure without addition of any other reactant at a reaction temperature within the range of 150° to 275° C. in the presence of a nickel molybdite-chromite catalyst, continuing said heating until the said methanol is converted, at least in part, to a normally solid essentially hydrocarbon wax, and thereafter separating the said wax from the resulting mixture.

3. Process for preparing a normally solid hydrocarbon wax which comprises introducing methanol into a pressure-resistant reaction vessel, heating the said methanol under a pressure within the range of from 70 atmospheres to 1000 atmospheres without addition of any other reactant at a reaction temperature within the range of 100° to 350° C. in the presence of a nickel molybdite-chromite catalyst, continuing said heating until the said methanol is converted, at least in part, to a normally solid essentially hydrocarbon wax, and thereafter separating the said wax from the resulting mixture.

4. Process of claim 3 wherein the time at the said reaction temperature is from 2 to 25 hours.

5. Process of claim 4 wherein the quantity of the said catalyst is from 3% to 15% of the weight of methanol introduced.

6. Process of claim 4 wherein the weight ratio of nickel molybdite:nickel chromite is within the range of 2:1 to 1:1.

References Cited in the file of this patent

UNITED STATES PATENTS

| | | |
|---|---|---|
| 2,181,640 | Deanesly et al. | Nov. 28, 1939 |
| 2,591,493 | Arnold et al. | Apr. 1, 1952 |

OTHER REFERENCES

Storch et al.: "The Fischer-Tropsch and Related Syntheses," published by Wiley & Sons, Inc., New York, 1951, page 590.